July 7, 1925.
J. LEVIN
SMOKING APPLIANCE
Filed May 13, 1922
1,545,147
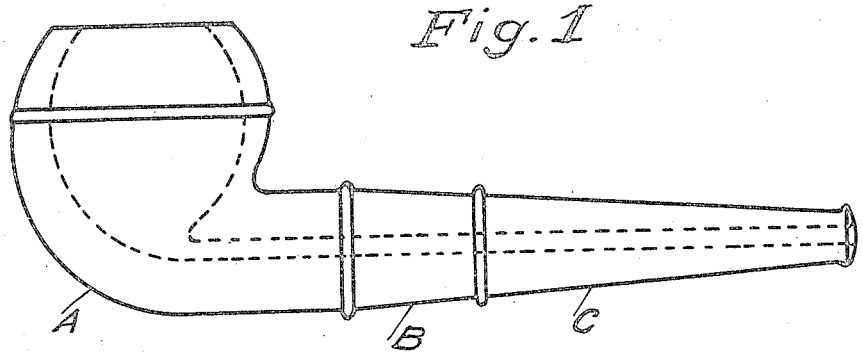
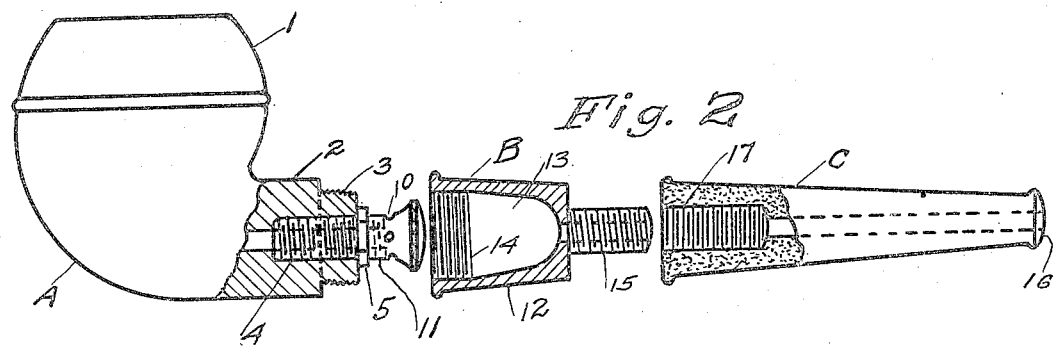
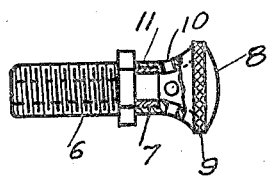
Jack Levin
INVENTOR.
BY Maurice Baskin
ATTORNEY.

Patented July 7, 1925.

1,545,147

UNITED STATES PATENT OFFICE.

JACK LEVIN, OF BALTIMORE, MARYLAND.

SMOKING APPLIANCE.

Application filed May 13, 1922. Serial No. 560,569.

*To all whom it may concern:*

Be it known that I, JACK LEVIN, citizen of Russia, residing at 2019 E. Pratt St., in the city of Baltimore and State of Maryland, have invented certain new and useful Improvements in Smoking Appliances, of which the following is a specification.

My invention relates to smoking stems and pipes and more particularly to a combination of parts whereby a combined cigarette holder, cigar holder, and pipe are so constructed and arranged that the device may be used as desired for either one of the above purposes.

A further object of the invention is to provide a smoking pipe, having a chamber or trap inserted in the path of the smoke, whereby nicotine and other noxious matter may be separated from the smoke and retained therein, thus making the use thereof more pleasant and wholesome.

A further object of the invention is to provide a universal smoker's appliance arranged in a very convenient and compact form and so constructed as to be very economical in construction and easily disassembled and cleaned.

Other and further objects of the invention will appear from the following description.

In the drawings, Fig. 1 shows an assembled complete view of the device; Fig. 2 represents the three main parts separately arranged; Fig. 3 shows an enlarged view of the nicotine trap and nipple.

As illustrated in the drawing, the device consists of three parts or sections, A, B and C. The part A constituting the smoking pipe body, consists of the tobacco receptacle (1) having a tubular stem (2) projecting therefrom. This body can be made of any suitable material, such as wood, meerschaum, etc. The outer end of the stem (2) is turned and has a screw thread (3) cut thereon for the purpose hereinafter set forth. Mounted in the stem (2) is a tubular nipple (4) having an enlarged section or shoulder (5) near one end thereof, the said nipple having screw threads (6—7) cut on its outer surface. The shoulder (5) may be made hexagonal or any other similar form for the purpose of facilitating the screwing of the said nipple into the stem (2). The outer end (7) of the nipple (4) has attached thereto the chamber of smoke trap (8) having an enlarged portion at its outer end, the said enlarged portion being knurled at its outer periphery (9). The trap (8) is further provided with a series of perforations (10) and has a tubular extension (11) threaded internally to fit over the threaded portion (7) of the nipple (4).

The part (B) may be made of any suitable material, preferably of some non-corrodible metal, such as nickel, silver, etc. It consists of the hollow body (12) having a conical recess (13) adapted for the insertion of the butt end of a cigar and having an internal thread (14) at the one end thereof, the said thread (14) adapted to fit over the thread (3) at the end of the tubular stem (2). The other end of the said body (B) consists of a tubular extension or nipple (15) threaded on the outside and integral with said body. Part B has an enlargement at its outer end; the said enlargement provided with a number of internal screw threads 14, of comparatively fine pitch, adapted to fit the corresponding threads 3 of the part A.

The part (C) may be made of amber, hard rubber, or any other suitable material. It consists of an elongated tubular stem having a mouthpiece (16) at one end thereof and an enlarged cavity (17) at the other end thereof, the said cavity (17) being of a dimension sufficient to hold the butt end of a cigarette and threaded internally so as to fit over the threaded end (15) of the body (B).

In practical use, the device in its assembled form, as shown in Fig. 1, is used as a smoking pipe. Should it be desired to use it as a cigar holder, all that is necessary is to unscrew the part (A) leaving parts (B) and (C) united, to be used as a cigar holder, by inserting the butt end of the cigar into the cavity (13). On the other hand should the smoker desire to use a cigarette holder, he will only have to unscrew the stem (C) and use the same as a cigarette holder by inserting the end of the cigarette in the cavity (17). The threads on the interior of cavities (17) and (13) will prevent the cigar or cigarette from slipping out.

Having thus described my invention what I claim and desire to protect by Letters Patent is:

1. In a smoking pipe, the combination of a pipe body having a projecting stem, a tubular trap section secured in said stem, the said trap section consisting of two parts to facilitate disassembling, an intermediate section fitting over said trap and stem, the said intermediate section having a small number of threads, of comparatively fine pitch, at its outer end, adapted to fit over the corresponding threads on the said stem, and a tubular end section adapted to fit over the end of the said intermediate section.

2. A smoking pipe having in combination a body section, a smoke trap attached thereto, the said smoke trap consisting of two detachable parts, and having an enlargement at its outer end, an intermediate section adapted to fit over said trap, a tubular end section detachably connected to the said intermediate section, for the purposes set forth.

3. An article of manufacture consisting of a smoking pipe body having a tubular nipple projecting therefrom, an enlarged chamber or trap detachably connected to one end of said nipple said trap having a series of openings around its periphery, a connecting section fitting over the said trap and nipple and detachably connected to said pipe body, the said section having a cavity at one end thereof adapted to receive the butt end of a cigar when disconnected from said pipe body and having a tubular stem projecting from the other end thereof and a tubular stem or mouthpiece section having an enlarged opening at one end thereof adapted to receive the butt end of a cigarette and to be detachably connected over the said tubular stem.

4. In a device of the character described, a tubular nipple an enlarged portion intermediate its ends, an enlarged chamber or trap detachably connected to one end of the said nipple, the said chamber being closed at one end thereof and having a series of openings through the sides thereof, the larger periphery of the said chamber being knurled to facilitate the detachment of the said trap from the said nipple.

5. In combination a smoking pipe body section, a stem projecting therefrom, having a threaded end, a tubular nipple having an enlargement intermediate its ends, one end of said nipple fitting into said stem, a chamber or trap detachably connected to the other end of said nipple, said trap having a closed end and a series of perforations around its periphery, the outer enlarged portion of said periphery being knurled to facilitate the removal of said chamber from said nipple, an intermediate section having a cavity at one end thereof adapted to receive the butt end of a cigar and detachably connected to said stem, and having a tubular projection at the other end thereof, and a mouthpiece section having an enlarged opening at one end thereof, said opening adapted to receive the end of a cigarette when disconnected from the smoking pipe and to fit over the said tubular projection when used with one or both of the other sections.

In testimony whereof I affix my signature.

JACK LEVIN